United States Patent
Pederson et al.

(10) Patent No.: US 7,229,085 B2
(45) Date of Patent: Jun. 12, 2007

(54) BALL STORAGE CART

(75) Inventors: Scott Lane Pederson, Owatonna, MN (US); Michael John Wagner, Lake Elmo, MN (US)

(73) Assignee: The Prophet Corp., Owatonna, MN (US)

( * ) Notice: Subject to any disclaimer, the term of this patent is extended or adjusted under 35 U.S.C. 154(b) by 238 days.

(21) Appl. No.: 10/914,409

(22) Filed: Aug. 9, 2004

(65) Prior Publication Data

US 2006/0027983 A1 Feb. 9, 2006

(51) Int. Cl.
*B62B 3/16* (2006.01)

(52) U.S. Cl. .............. 280/79.3; 280/33.995; 280/47.35; 211/14; 211/15

(58) Field of Classification Search ......... 280/47.19, 280/47.35, 79.3, 33.991, 33.997, 33.998; 211/14, 15
See application file for complete search history.

(56) References Cited

U.S. PATENT DOCUMENTS

| | | | | |
|---|---|---|---|---|
| 2,901,262 A | | 8/1959 | Berlin | |
| 2,916,293 A | * | 12/1959 | Lang | 280/79.3 |
| 3,371,795 A | | 3/1968 | Rosonke | |
| 3,953,044 A | * | 4/1976 | Wilson | 280/33.996 |
| 4,616,756 A | | 10/1986 | Holtz | |
| 4,627,542 A | * | 12/1986 | Fredrickson | 211/150 |
| 5,010,848 A | * | 4/1991 | Rankin | 119/461 |
| 5,507,541 A | | 4/1996 | Chen et al. | |
| 5,865,449 A | * | 2/1999 | Castaneda | 280/33.996 |
| D409,811 S | | 5/1999 | Hutchinson | |
| D436,239 S | | 1/2001 | Walsh | |
| 6,318,295 B1 | * | 11/2001 | Wade | 119/500 |
| D457,767 S | * | 5/2002 | Schumacher | D6/552 |
| 6,866,289 B2 | * | 3/2005 | Prather | 280/651 |
| 6,869,097 B2 | * | 3/2005 | Prather et al. | 280/651 |
| 2002/0167139 A1 | | 11/2002 | Prather et al. | |
| 2002/0171214 A1 | | 11/2002 | Prather | |

FOREIGN PATENT DOCUMENTS

| | | |
|---|---|---|
| EP | 0 289 428 | 4/1988 |
| GB | 2 177 354 | 7/1986 |
| JP | 54-76062 | 5/1979 |
| JP | 60-190359 | 12/1985 |
| JP | 62-42854 | 3/1987 |
| JP | 5-74560 | 10/1993 |
| JP | 3-086281 | 3/2002 |

* cited by examiner

*Primary Examiner*—Jeff Restifo
(74) *Attorney, Agent, or Firm*—Merchant & Gould P.C.

(57) ABSTRACT

A moveable ball cart having a lower receptacle and an upper receptacle vertically stacked and spaced, with the top of each being open. Each of the receptacles is accessible through its top and through a vertically hinged door in a sidewall that pivots horizontally. The receptacles also have a floor sloped toward the door, to facilitate removal of balls from the cart.

10 Claims, 3 Drawing Sheets

BALL STORAGE CART

FIELD

The present disclosure relates to a movable storage cart for storage of items, such as balls. In particular, the storage cart has first and second item receptacles vertically aligned and spaced.

BACKGROUND

Balls, such a basketballs, soccer balls and volleyballs, are a mainstay in athletic sports. In many facilities, such as school gyms, recreation centers, camps, and other facilities, a large number of balls are needed in order to accommodate the multiple simultaneous activities. Having a large number of balls can be inconvenient. Storage of the balls, when not in use, can be difficult; if not contained, balls can roll throughout the storage area. Having the balls easily accessible for users can also be inconvenient. Congestion occurs when multiple users simultaneously attempt to replace their balls in the storage area.

One attempt to store and transport a large number of balls to an area remote from the storage area has been in a flexible bag, which is often made from a mesh material. Although fairly inexpensive and easy to store when not filled with balls, filling a bag can be difficult, as the bag has no structure to hold open its mouth to provide easy access to its interior. A filled bag has a tendency to droop and sag when placed on the floor or other hard surface, with the balls moving to their lowest position in the bag. Also, a filled bag is often difficult to carry.

A better attempt to store and transport a large number of balls has been in a wheeled cart. The cart has a receptacle for holding the balls, and can be easily moved across a surface such as a floor. The number of balls contained and transported by the cart is limited by the size of the receptacle. Unfortunately, too large of a receptacle decreases the mobility of the cart.

What is desired is an improved cart that has a high storage capacity, and that is easy to load and unload.

SUMMARY OF THE DISCLOSURE

The present disclosure relates to a movable storage cart for storage of items, such as balls. In particular, the storage cart has first and second item receptacles vertically aligned and spaced from one another. The cart has framing that supports both first and second receptacles, and which can facilitate movement of the cart by providing support for translocation elements, such as wheels.

The top of each receptacle is open and unobstructed, to allow for easy placement of items into each receptacle. Each receptacle has a hinged door in a side wall, to allow for easy removal of items from each receptacle. The doors are hinged vertically, to provide horizontal or lateral pivoting of the doors.

In one particular aspect, the disclosure is directed to a cart having a first receptacle and a second receptacle. The first receptacle comprises a perimeter wall having an access door therein, the access door being vertically hinged to allow horizontal pivoting of the access door, a bottom edge and a top edge of the perimeter wall, and a floor extending across the area defined by the perimeter wall, with the floor positioned at angle other than zero in relation to the surface on which the cart is positioned and sloping toward the access door. The second receptacle comprises a perimeter wall having an access door therein, the access door being vertically hinged to allow horizontal pivoting of the access door, a bottom edge and a top edge of the perimeter wall, and a floor extending across the area defined by the perimeter wall, the floor positioned at angle other than zero in relation to the surface on which the cart is positioned and sloping toward the access door. The cart also has framing extending between the first receptacle and the second receptacle, the framing holding the second receptacle above and spaced from the first receptacle.

In another particular aspect, the disclosure is directed to a moveable ball cart having a lower receptacle with an accessible front, a back, a left side and a right side, the front, back, left side and right side together defining an upper edge and a bottom edge, the lower receptacle having an open top and including a floor sloping at an angle of at least 1 degree in respect to the bottom edge toward the accessible front. The cart also has an upper receptacle vertically positioned above the lower receptacle, the upper receptacle having an accessible front, a back, a left side and a right side, the front, back, left side and right side together defining a bottom edge, the upper receptacle including a floor sloping at an angle of at least 1 degree in respect to the bottom edge toward the accessible front. The distance between the upper edge of the lower receptacle and the bottom edge of the upper receptacle is at least 6 inches.

Additional details regarding carts according to the present disclosure and methods of using the carts are provided below.

DETAILED DESCRIPTION OF THE DISCLOSURE

Figure 1:
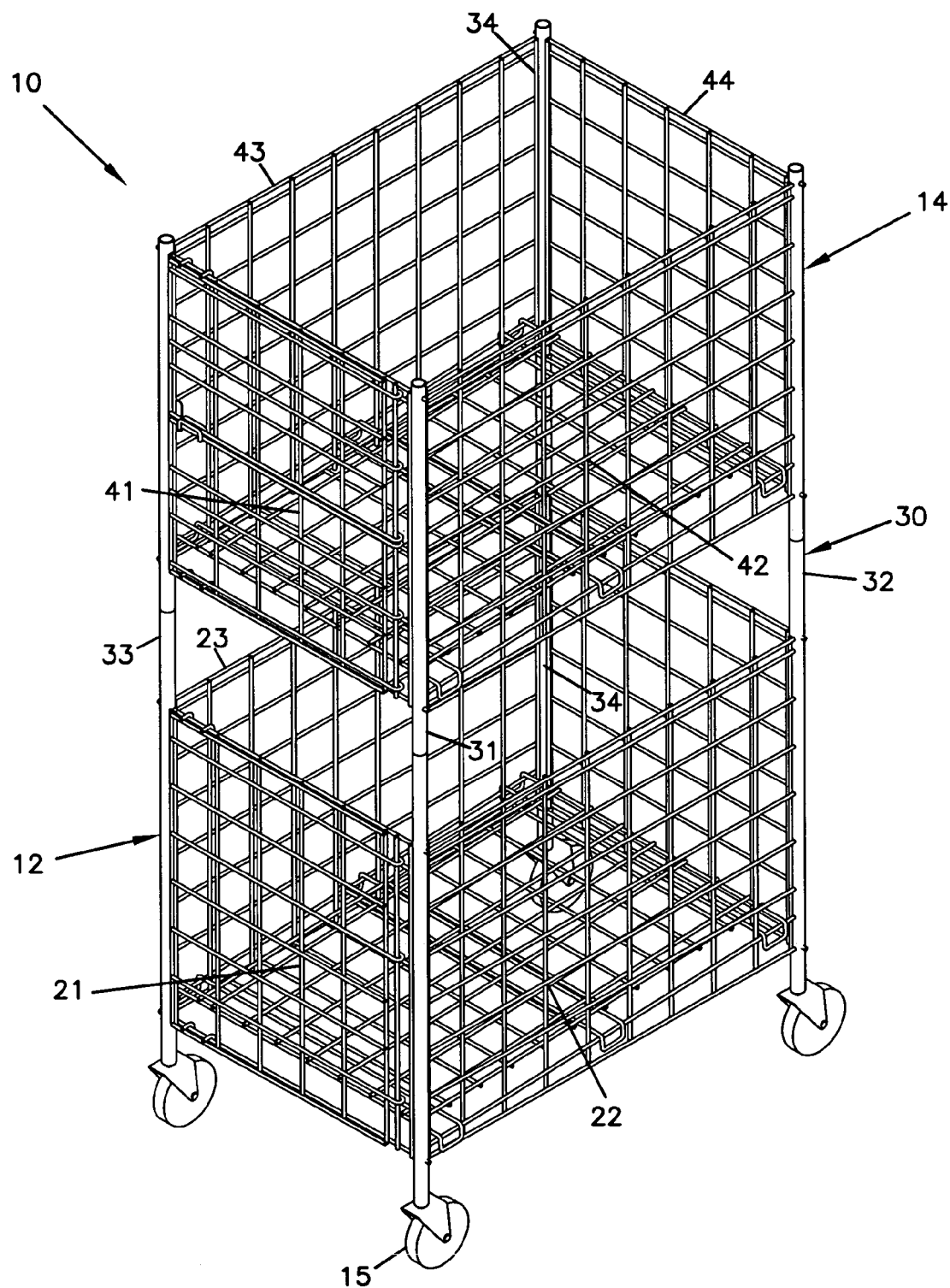
FIG. 1 is a perspective front and left side view of a ball cart according to the present disclosure, with upper and lower receptacles having access doors in a closed position.

Referring to the figures, wherein like numerals throughout the figures represent like elements, there is schematically illustrated a movable ball cart 10. Cart 10 comprises a first, lower receptacle 12, a second, upper receptacle 14, and appropriate structural framing 30 supporting lower receptacle 12 and upper receptacle 14. Cart includes translocation members 15, such as wheels, positioned on framing 30. Lower receptacle 12 and upper receptacle 14 are vertically aligned and spaced, as will be described in detail below.

Each of lower receptacle 12 and upper receptacle 14 is configured for receiving and retaining a plurality of items, such as balls. Receptacles 12, 14 have a rigid structure, meaning, that the shape of receptacles 12, 14 does not appreciably change when loaded compared to when empty.

Lower receptacle 12 has a front side 21, a left side 22, a right side 23 and a back side 24 that form a perimeter wall for lower receptacle 12. Similarly, upper receptacle has a front side 41, a left side 42, a right side 43 and a back side 44 that form a perimeter wall for upper receptacle 14. It is understood that these designations "front", "left", "right", and "back" are not to be limiting, rather, these spatial designations are used to facilitate understanding of cart 10. Lower receptacle 12 includes an upper edge 27, which extends around and defines the upper perimeter of lower receptacle 12. In general, no portion of lower receptacle 12 extends above upper edge 27 and closer to upper receptacle 14.

Although the embodiment illustrated in the figures and described above has receptacles 12, 14 having four side walls (front, left, right and back) forming the perimeter wall, it is under stood that other configurations could be suitable, such a three-walled, six-walled, etc. Four walled configurations may have all four sides similarly sized (for a square receptacle) or may have two sides, such as left side 22, 42 and right side 23, 43 being larger than front 21, 41 and back 24, 44 (for a rectangular receptacle). For four walled configurations, front 21, 41 is generally perpendicular to left side 22, 42 and to right side 23, 43 and parallel to back 24, 44, forming right angles between the various sides 21, 22, 23, 24, 41, 42, 43, 44. Typically and preferably, sides 21, 22, 23, 24, 41, 42, 43, 44 extend perpendicular to the surface on which cart 10 resides; generally, this extension is in a vertical orientation.

Lower receptacle 12 has a bottom edge 26 and upper receptacle 14 has a bottom edge 46, which is defined by the various sides 21, 22, 23, 24 and sides 41, 42, 43, 44, respectively. Each bottom edge 26, 46 is generally parallel to the surface on which cart 10 resides and perpendicular to sides 21, 22, 23, 24, 41, 42, 43, 44. Additionally, lower receptacle 12 has a sloped floor 25 which is positioned at an angle (other than zero) to bottom edge 26 and upper receptacle 14 has a sloped floor 45, which is positioned at an angle to bottom edge 46. Sloped floor 25, 45 extends across the area between sides 21, 22, 23, 24 and sides 41, 42, 43, 44.

Figure 4:
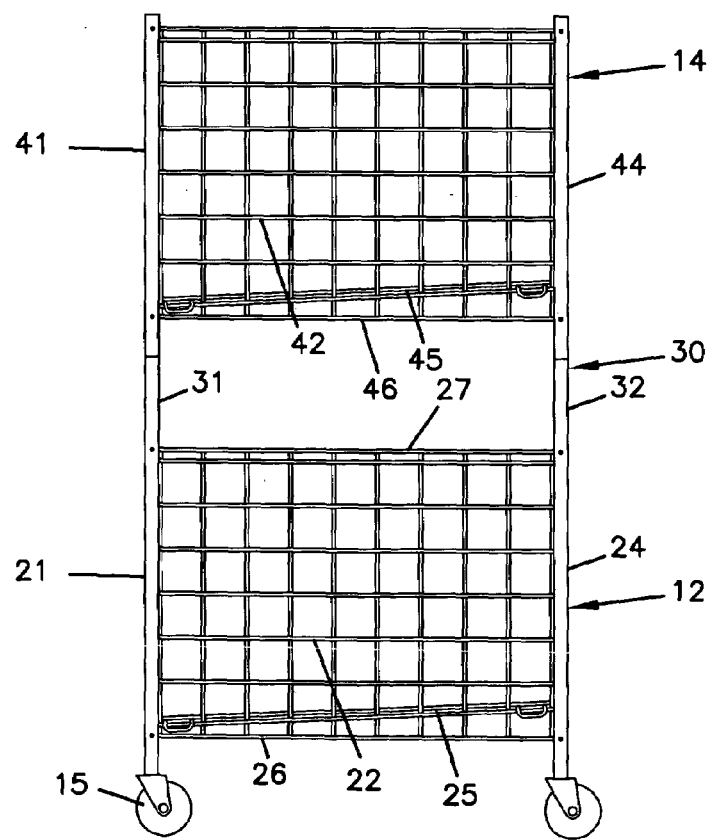
FIG. 4 is a side plan view of the left side of the cart of FIG. 1.

Generally, the angle between sloped floor 25, 45 and bottom edge 26, 46 is at least about 1 degree and no more than about 15 degrees. Typically, the angle is about 1.5 to 5 degrees. As best seen in FIG. 4, sloped floor 25 extends from back 24 down to front 21, and sloped floor 45 extends from back 44 down to front 41. Sloped floor 25, 45 facilitates the removal of items from receptacles 12, 14, as will be explained below.

Preferably, the top of each receptacle is open. That is, there is no structure extending across receptacles 12, 14 from sides 21, 22, 23, 24 and sides 41, 42, 43, 44, respectively.

Each of receptacles 12, 14 includes an access door in a side wall; in the figures, front wall 21 of lower receptacle 12 includes door 28 and front wall 41 of upper receptacle 14 includes door 48. Each of doors 28, 48 is vertically hinged so that it pivots or swings horizontally, opening front wall 21, 41 and providing access to the interior of receptacles 12, 14 through a side wall. Doors 28, 48 are present in the wall toward which sloped floor 25, 45 angles; in the illustrated cart, as best seen in FIG. 4, sloped floor 25, 45 angles toward front 21, 41 and door 28, 48. Thus, items on sloped floor 25, 45 have a tendency to move toward door 28, 48.

Figure 2:
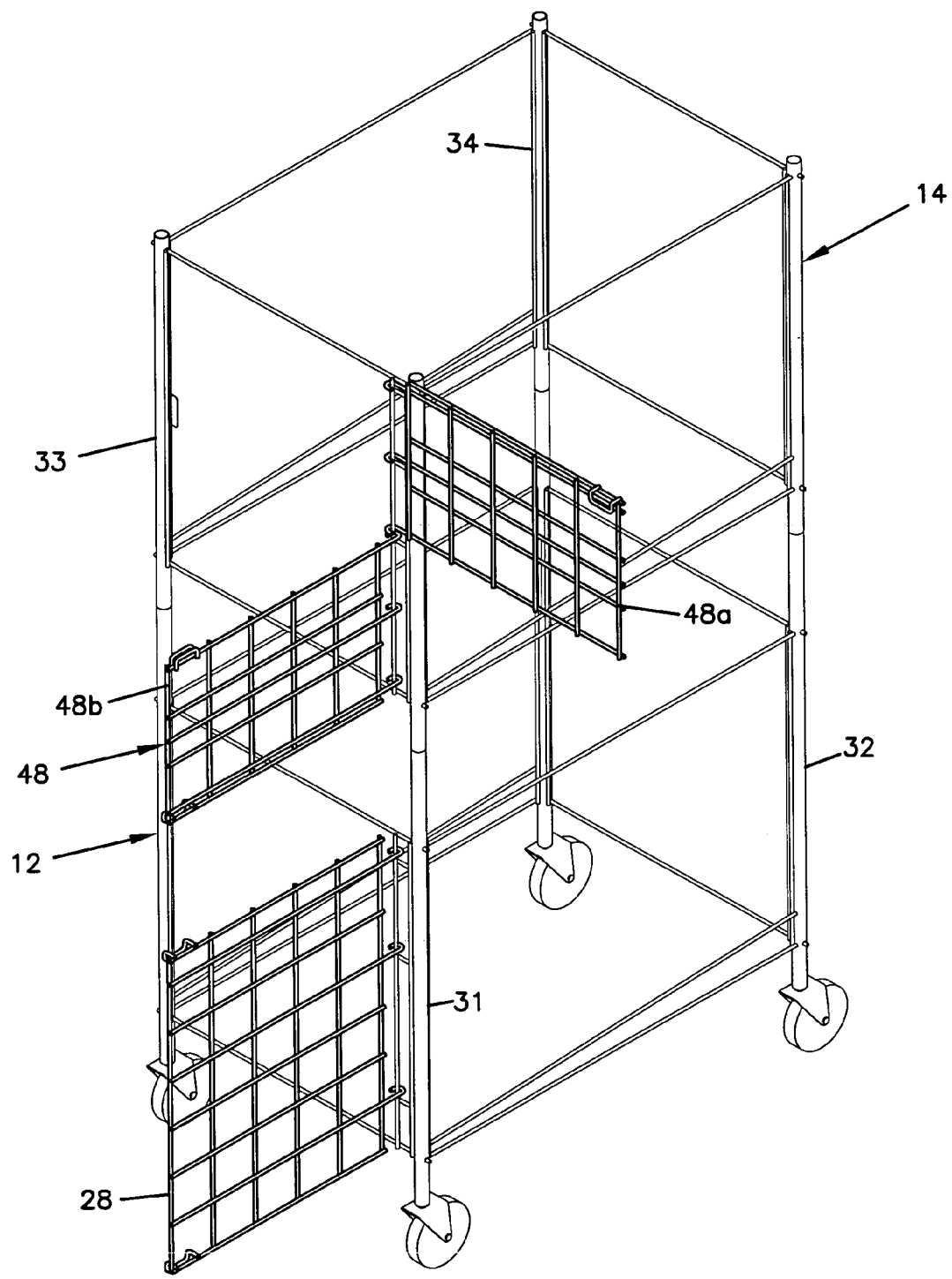
FIG. 2 is a diagrammatic perspective view of the ball cart of FIG. 1 with the access doors in an open position, with portions of the cart removed to emphasize the access doors.
Figure 3:
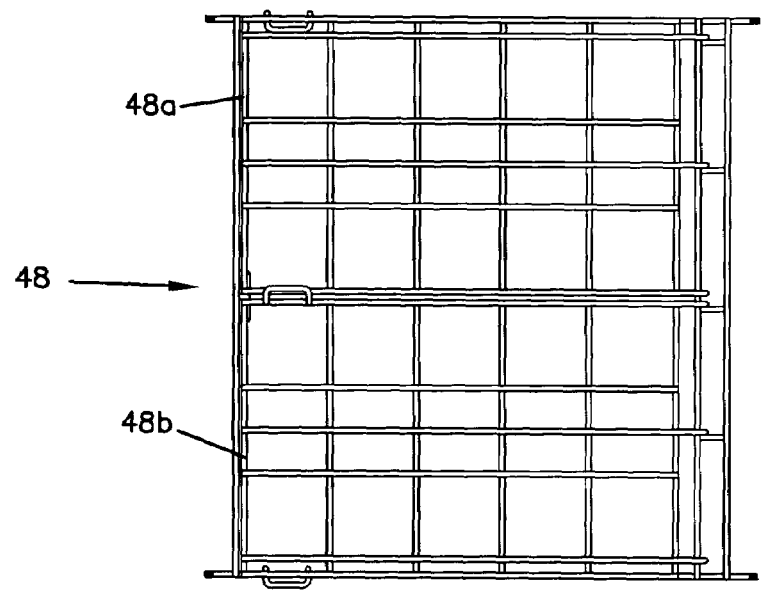
FIG. 3 is a front plan view of a multi-section access door for a receptacle of the cart of the present disclosure.

Referring to FIGS. 2 and 3, a preferred design for upper door 48 is shown. Door 48 has a first, upper portion 48a and a second, lower portion 48b, which operate independently of one another. Thus upper portion 48a can be opened and lower portion 48b can remain closed.

As stated above, upper receptacle 14 is vertically aligned with and spaced from lower receptacle 12. Framing 30 supports receptacles 12, 14 and maintains the desired spaced alignment. As best seen in FIG. 2, framing 30 includes first vertical frame member 31, second vertical frame member 32, third vertical frame member 33 and fourth vertical frame member 34. Each of these frame members 31, 32, 33, 34 extends between upper receptacle 14, to lower receptacle 12, and contacts the surface on which cart 10 is positioned. In the preferred embodiment illustrated, attached to each of frame members 31, 32, 33, 34 is a wheel 15, which allows cart 10 to be easily moveable.

Upper receptacle 14 is spaced from lower receptacle 12 to allow easy access to the interior of lower receptacle 12 through its open top. Cart 10 is configured and designed to be used with items such as balls. Common examples and sizes of balls for use with cart 10 include basketballs, volleyballs, soccer balls, and handballs. These balls typically have a diameter of about 6 to 10 inches in diameter.

Upper receptacle 14 is vertically spaced from lower receptacle 12 a distance sufficient to pass a ball therethrough. That is, the distance between upper edge 27 of lower receptacle 12 and bottom edge 46 of upper receptacle 14 is large enough to pass a ball therethrough. Typically, this distance is at least 6 inches and no more than about 18 inches. A preferred distance is about 8 to 15 inches.

To load cart 10, items such as balls, are deposited into either receptacle 12 or receptacle 14. To gain access into receptacle 12, the items are passed between bottom edge 46 and upper edge 27. To gain access into receptacle 14, the items are merely placed over the upper edge of sides 41, 42, 43, 44.

To empty lower receptacle 12, door 28 is pivoted horizontally to open front 21. Items can be manually grabbed from the interior of receptacle 12, or may fall out on their own.

To empty upper receptacle 14, door 48 can be opened in various manners. Top portion 48a of door 48 can be pivotally opened, allowing items above the level of lower portion 48b to fall out. Subsequently, lower portion 48b can be pivotally opened, allowing all items to fall out. Alternately, door 48, with both portions 48a, 48b can be pivotally opened, so that all items are accessible.

An Exemplary Design

A cart 10 having a preferred design was made. Referring to the figures for ease of understanding, a cart 10 was made that had two receptacles 12, 14, each being 26 inches wide (across front 21, 41 and back 24, 44), 37 inches deep (along left side 22, 42 and right side 23, 43, and 26 inches tall (from bottom 26, 46 to its top edge). Each receptacle 12, 14 had a bottom 26, 46 that was generally horizontal to the surface on which the cart sat, and each receptacle also had a sloped floor 25, 45, at an angle of approximately 3 degrees to the horizontal floor 26, 46. Thus, at a first side, the distance between sloped floor 25, 45 and bottom 26, 46 was 1 inch and at a second side, the distance was about 2.7 inch.

The four side walls and the bottom formed an interior of the receptacle. The top of each receptacle was open; that is, there was no top extending across the interior of the receptacles. Each side, including the horizontal bottom and the sloped bottom, was formed from ¼ gauge powder-coated-steel wire, forming a woven pattern having apertures generally 4 by 4 inches. Each receptacle 12, 14 was able to hold approximately 30 volleyballs or basketballs.

The two receptacles 12, 14 were individually made. Located at the outside corners formed by the four sidewalls was a framing member 31, 32, 33, 34 made from 1 inch diameter 16 gauge tube steel. The two receptacles were vertically stacked, as illustrated in FIG. 1, to provide an upper receptacle and a lower receptacle. To assemble cart 10, the upper receptacle 14 was placed on top of the lower receptacle 12 so that the framing members from the upper receptacle slid over and engaged the lower framing members. The distance between the upper receptacle and the top edge of the lower receptacle was about 12 inches.

The tubular framing extended below the bottom of the lower receptacle 12 about 4 inches. At the base of each framing member of the lower receptacle was a rubber caster.

The lower receptacle had a vertically hinged door present in the 26 inch wide wall to which the sloped floor angled. The upper receptacle had a vertically hinged multi-sectional door present in the 26 inch wide wall to which the sloped floor angled. The multi-sectional door was constructed to allow a top portion of the door to pivot independently from a bottom portion of the door. The doors were formed from ¼ gauge powder-coated-steel wire, forming a woven pattern having apertures generally 4 by 4 inches and 2 by 4 inches. The hinges for the access doors were made by bending horizontally-positioned wire of the door around a vertical wire piece adjacent the framing member 31 (see FIG. 2).

The overall size of the cart was 37 inches long, 26 inches wide and 69 inches high. The cart weighed approximately 65 pounds.

The inventive ball cart has been described with reference to various specific and preferred embodiments and techniques. However, it should be understood that many variations and modifications may be made from the specific disclosure above. For example, although an example has been provided having both receptacles having sloped floors, it is within the scope of this disclosure to have only one of the receptacles having a sloped floor. Also as an example, both receptacles may have a split door, having a top portion and a lower portion, which are pivotal independently. Other variations are within the spirit and scope of this disclosure.

What is claimed:

1. A cart for placement on a surface, the cart comprising:
   (a) a first receptacle comprising: a perimeter wall having an access door therein, the access door vertically hinged to allow horizontal pivoting of the access door, a bottom edge and a top edge of the perimeter wall, and a floor extending across the area defined by the perimeter wall, the floor positioned at angle other than zero in relation to the surface on which the cart is positioned and sloping toward the access door;
   (b) a second receptacle comprising: a perimeter wall having an access door therein, the access door vertically hinged to allow horizontal pivoting of the access door, a bottom edge and a top edge of the perimeter wall, and a floor extending across the area defined by the perimeter wall, the floor positioned at angle other than zero in relation to the surface on which the cart is positioned and sloping toward the access door; and
   (c) the second receptacle positioned above and spaced from the first receptacle;
   wherein at least one of the access door of the first receptacle and the access door of the second receptacle is a multi-section door comprising at least two door sections, said door sections being disposed in over-and-under configuration.

2. The cart according to claim 1, wherein:
   (a) the floor of the first receptacle is at angle of about 1-5 degrees in relation to the surface on which the cart is positioned; and
   (b) the floor of the second receptacle is at angle of about 1-5 degrees in relation to the surface on which the cart is positioned.

3. The cart according to claim 1, wherein:
   (a) the floor of the first receptacle is at angle of about 1-5 degrees in relation to the bottom edge; and
   (b) the floor of the second receptacle is at angle of about 1-5 degrees in relation to the bottom edge.

4. The cart according to claim 1, wherein a distance between the bottom edge of the second receptacle and the top edge of the first receptacle is at least 6 inches.

5. The cart according to claim 4, wherein a distance between the bottom edge of the second receptacle and the top edge of the first receptacle is 8 to 15 inches.

6. The cart according to claim 1, wherein the access door of the other of the at least one of the access door of the first receptacle and the access door of the second receptacle is a multi-section door.

7. The cart according to claim 1, further comprising wheels.

8. The cart according to claim 1, wherein:
   (a) the perimeter wall of the first receptacle comprises four side walls; and
   (b) the perimeter wall of the second receptacle comprises four side walls.

9. A moveable ball cart comprising:
   (a) a lower receptacle having an accessible front, a back, a left side and a right side, the front, back, left side and right side together defining an upper edge and a bottom edge; the lower receptacle having an open top and including a floor sloping at an angle of at least 1 degree in respect to the bottom edge toward the accessible front;
   (b) an upper receptacle vertically positioned above the lower receptacle, the upper receptacle having an accessible front, a back, a left side and a right side, the front, back, left side and right side together defining a bottom edge; the upper receptacle including a floor sloping at an angle of at least 1 degree in respect to the bottom edge toward the accessible front; and
   (c) a distance of at least 6 inches between the upper edge of the lower receptacle and the bottom edge of the upper receptacle;
   wherein the accessible front of each of the lower receptacle and the upper receptacle is vertically hinged to allow horizontal pivoting, and wherein the accessible front of the upper receptacle is accessible via a multi-sectional door vertically hinged to allow horizontal pivoting, said multi-sectional door comprising at least two door sections, said door sections being disposed in over-and-under configuration.

10. The cart according to claim 9, wherein the distance between the upper edge of the lower receptacle and the bottom edge of the upper receptacle is 8 to 15 inches.

* * * * *